United States Patent
Koyanagi

(10) Patent No.: US 11,664,170 B2
(45) Date of Patent: May 30, 2023

(54) ELECTROLYTIC CAPACITOR AND SEAT PLATE

(71) Applicant: Panasonic Intellectual Property Management Co., Ltd., Osaka (JP)

(72) Inventor: Kentaro Koyanagi, Saga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 336 days.

(21) Appl. No.: 16/735,518

(22) Filed: Jan. 6, 2020

(65) Prior Publication Data
US 2020/0251288 A1   Aug. 6, 2020

(30) Foreign Application Priority Data
Jan. 31, 2019   (JP) .............................. JP2019-016438

(51) Int. Cl.
  *H01G 9/08*   (2006.01)
  *H01G 9/008*  (2006.01)
  *H01G 9/10*   (2006.01)

(52) U.S. Cl.
  CPC .............. *H01G 9/08* (2013.01); *H01G 9/008* (2013.01); *H01G 9/10* (2013.01)

(58) Field of Classification Search
  CPC ............ H01G 9/08; H01G 9/008; H01G 9/10
  See application file for complete search history.

(56) References Cited

U.S. PATENT DOCUMENTS

| | | | | |
|---|---|---|---|---|
| 4,591,951 A | * | 5/1986 | Iwamoto | H05K 3/3426 361/306.1 |
| 5,769,907 A | * | 6/1998 | Fukuda | H01G 9/15 29/25.03 |
| 5,880,926 A | * | 3/1999 | Nishino | H05K 3/301 361/531 |
| 2006/0176647 A1 | * | 8/2006 | Nitta | H01G 9/151 361/512 |
| 2008/0130201 A1 | * | 6/2008 | Kodera | H01G 9/008 361/500 |

(Continued)

FOREIGN PATENT DOCUMENTS

| | | |
|---|---|---|
| CN | 102483996 A | 5/2012 |
| CN | 107430940 A | 12/2017 |

(Continued)

OTHER PUBLICATIONS

English Translation of Chinese Office Action dated Jan. 11, 2023 for the related Chinese Patent Application No. 202010075976.0.

*Primary Examiner* — David M Sinclair
(74) *Attorney, Agent, or Firm* — McDermott Will & Emery LLP

(57) ABSTRACT

An electrolytic capacitor includes a capacitor main body. The capacitor main body includes an exterior member and a pair of lead members. The exterior member includes a case and a closing part. The case has a hollow column shape. The case includes an opening part at an end in an axial direction of the hollow column shape. The closing part closes the opening part. The pair of lead members each include a drawn part exposed from the closing part. The drawn part has a bar shape. When viewed in the axial direction, a width of the drawn part is 0.1 times or more of a diameter of the exterior member.

10 Claims, 8 Drawing Sheets

(56) References Cited

U.S. PATENT DOCUMENTS

| | | | | |
|---|---|---|---|---|
| 2012/0250226 A1* | 10/2012 | Hirota | ............... | H01G 9/10 |
| | | | | 361/518 |
| 2012/0267161 A1* | 10/2012 | Yano | ............... | H01G 4/228 |
| | | | | 174/110 SR |
| 2013/0321985 A1* | 12/2013 | Djebara | ............. | B23K 26/28 |
| | | | | 228/171 |
| 2017/0372843 A1* | 12/2017 | Matsumoto | ......... | H01G 9/035 |
| 2019/0311858 A1* | 10/2019 | Will | ............... | H01G 9/035 |

FOREIGN PATENT DOCUMENTS

| | | | | | |
|---|---|---|---|---|---|
| JP | 60-148107 | | 8/1985 | | |
| JP | 60-245119 | | 12/1985 | | |
| JP | 3-062913 | | 3/1991 | | |
| JP | 03225913 | A * | 10/1991 | | |
| JP | 2000-012384 | | 1/2000 | | |
| JP | 2000021683 | A * | 1/2000 | | |
| JP | 2001085270 | A * | 3/2001 | | |
| JP | 2006286985 | A * | 10/2006 | | |
| JP | 2009170756 | A * | 7/2009 | | |
| JP | 2013168402 | A * | 8/2013 | | |
| JP | 2014022670 | A * | 2/2014 | | |
| JP | 2015035454 | A * | 2/2015 | | |
| JP | 2018061031 | A * | 4/2018 | ............. | H01G 11/78 |

\* cited by examiner

ELECTROLYTIC CAPACITOR AND SEAT PLATE

BACKGROUND

1. Technical Field

The present disclosure relates to electrolytic capacitors and seat plates. In particular, the present disclosure relates to an electrolytic capacitor including an exterior member and lead members, and to a seat plate provided to the electrolytic capacitor.

2. Description of the Related Art

Electrolytic capacitors each including an exterior member and lead members have been known (e.g., Unexamined Japanese Patent Publication No. 60-148107). The electrolytic capacitor described in Unexamined Japanese Patent Publication No. 60-148107 includes a metallic case (exterior member) having a bottomed cylinder shape, and a pair of lead wires (lead members). The pair of lead members are drawn from the exterior member.

SUMMARY

An electrolytic capacitor according to one aspect of the present disclosure includes a capacitor main body. The capacitor main body includes an exterior member and a pair of lead members. The exterior member includes a case and a closing part. The case has a hollow column shape. The case includes an opening part at an end in an axial direction of the hollow column shape. The closing part closes the opening part. The pair of lead members each include a drawn part exposed from the closing part. The drawn part has a bar shape. When viewed in the axial direction, a width of the drawn part is 0.1 times or more of a diameter of the exterior member.

A seat plate according to one aspect of the present disclosure is provided to an electrolytic capacitor. The electrolytic capacitor includes a capacitor main body. The capacitor main body includes an exterior member and a pair of lead members. The exterior member includes a case and a closing part. The case has a hollow column shape. The case includes an opening part at an end in an axial direction of the hollow column shape. The closing part closes the opening part. The pair of lead members each include a drawn part exposed from the closing part, the drawn part has a bar shape. When viewed in the axial direction, a width of the drawn part is 0.1 times or more of a diameter of the exterior member. The pair of lead members further each include an extended part. The extended part is connected to the drawn part. The extended part has a thickness smaller than a width of the drawn part. The seat plate has a pair of through holes and includes a partition wall. The pair of through holes respectively allow the pair of lead members to pass through. The partition wall includes a part of an inner surface of each of the pair of through holes. The partition wall partitions the pair of through holes. The seat plate is attached to the capacitor main body so that, when viewed in the axial direction, a virtual circle partially overlaps with the partition wall. The virtual circle has a center identical to a center of the drawn part. The virtual circle has a diameter having same length as a width of the extended part.

An advantage of the present disclosure is that equivalent series resistance (ESR) of an electrolytic capacitor can be easily decreased.

DETAILED DESCRIPTION OF EMBODIMENT

Figure 1:
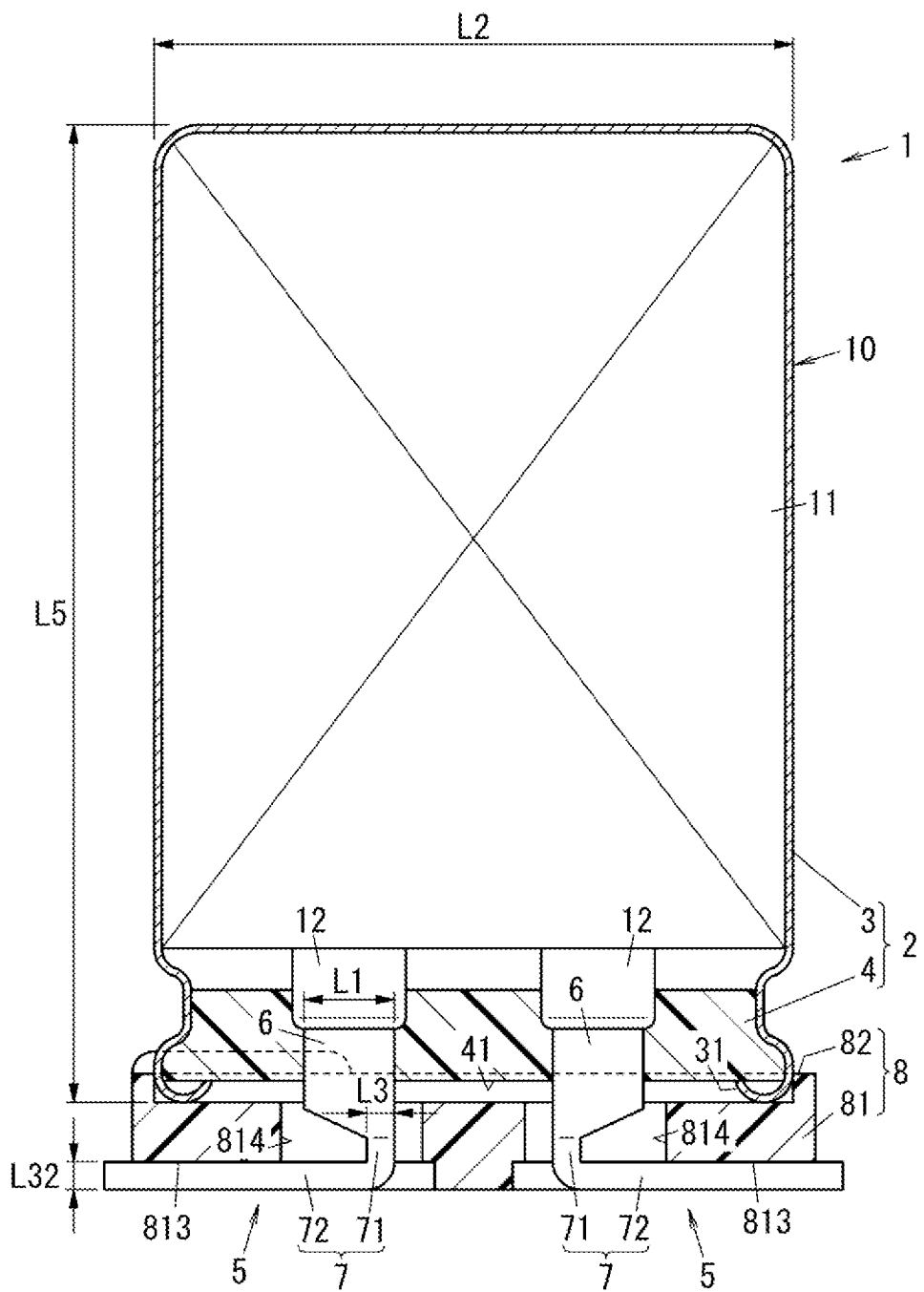
FIG. 1 is a cross-sectional view illustrating an electrolytic capacitor according to an exemplary embodiment.

A decrease in equivalent series resistance (ESR) has sometimes been demanded for electrolytic capacitors in accordance with use conditions for the electrolytic capacitors, for example.

The present disclosure provides an electrolytic capacitor with which the ESR is easily decreased, and a seat plate provided to the electrolytic capacitor.

An electrolytic capacitor and a seat plate according to an exemplary embodiment will now be described with reference to the accompanying drawings. The exemplary embodiment described below is merely one of various exemplary embodiments of the present disclosure. Various modifications may be made to the exemplary embodiment to suit design or other requirements as long as the object of the present disclosure is fulfilled. Drawings described in the below exemplary embodiment, for example, are merely schematic diagrams. Ratios in size and thickness of components in the drawings do not always reflect actual dimensional ratios.

As a typical example, the exemplary embodiment is described under an assumption that electrolytic capacitor 1 be an aluminum electrolytic capacitor.

(1) Configuration of Example

As illustrated in FIG. 1, electrolytic capacitor 1 includes capacitor main body 10. Capacitor main body 10 includes exterior member 2 and a pair of lead members 5.

Exterior member 2 includes case 3 and closing part 4. Case 3 is formed into a hollow, circular column shape. Case 3 includes opening part 31 at an end in an axial direction of the circular column shape. Closing part 4 closes opening part 31.

The pair of lead members 5 respectively include drawn parts 6 each having a bar shape. Drawn parts 6 are exposed from closing part 4. That is, drawn parts 6 project from surface 41 of closing part 4. Surface 41 is exposed to outside of case 3. In the exemplary embodiment, drawn parts 6 each have a circular column shape.

Figure 2:
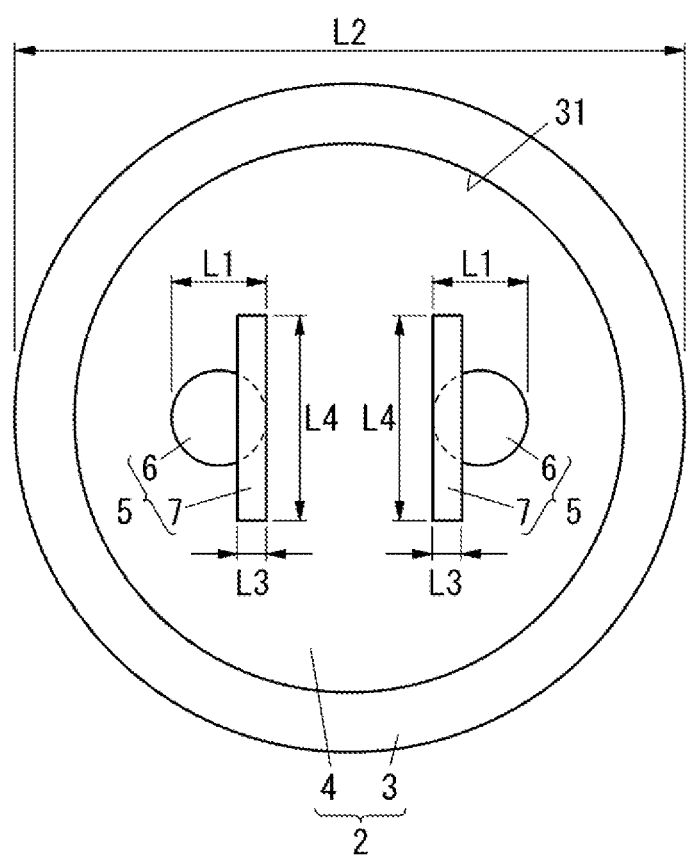
FIG. 2 is a bottom view illustrating the electrolytic capacitor, from which a seat plate and second portions are omitted.

In FIG. 2, respective second portions 72, described later, of the pair of lead members 5 are omitted from illustration. As illustrated in FIG. 2, width L1 of each of drawn parts 6 when viewed in the axial direction (a long-side direction) of case 3 is 0.1 times or more of diameter L2 of exterior member 2. In the exemplary embodiment, in here, drawn parts 6 each have the circular column shape. In the exemplary embodiment, width L1 of each of drawn parts 6 when viewed in the axial direction of case 3 therefore corresponds to a diameter of each of drawn parts 6. When, in a cross section taken along a plane perpendicular to the axial direction of case 3, a cross sectional shape of each of drawn parts 6 has a longer length in one direction than that in the other direction (e.g., rectangular shape), width L1 of each of drawn parts 6 corresponds to a shortest length of each of drawn parts 6 in the cross section taken along the plane perpendicular to the axial direction of case 3.

With the exemplary embodiment, the ESR of electrolytic capacitor 1 is easily decreased, compared with a case where width L1 of each of drawn parts 6 is less than 0.1 times of diameter L2 of exterior member 2. That is, increasing the width of each of drawn parts 6 decreases electric resistance of the drawn parts 6, decreasing the ESR of electrolytic capacitor 1. When the ESR is decreased, a ripple current allowed to flow into electrolytic capacitor 1 is increased. As the ripple current flows into electrolytic capacitor 1, electrolytic capacitor 1 may generate heat. By increasing the width of each of drawn parts 6, heat generated in electrolytic capacitor 1 is easily transferred through lead members 5 to be radiated. Hence, the ripple current allowed to be capable to flow into electrolytic capacitor 1 can be increased. In electrolytic capacitor 1, as described above, an allowable value of the ripple current increases.

An example of width L1 of each of drawn parts 6 is 0.8 mm. An example of diameter L2 of exterior member 2 is 6.3 mm.

Hereinafter, a configuration of electrolytic capacitor 1 will be described in more detail with reference to FIG. 1.

In addition to capacitor main body 10, electrolytic capacitor 1 further includes seat plate 8. Capacitor main body 10 further includes capacitor element 11 and a pair of lead tabs 12.

Capacitor element 11 includes an anode body, a cathode body, and a separator. The anode body includes a metallic foil containing valve metal such as aluminum, tantalum, or niobium, and a dielectric layer formed on a surface of the metallic foil. The cathode body includes a metallic foil such as aluminum. The separator is disposed between the anode body and the cathode body to hold electrolyte. As the electrolyte, solid electrolyte such as conductive polymer, or an electrolytic solution can be used, for example. Otherwise, conductive polymer and an electrolytic solution may both be used. The anode body, the cathode body, and the separator are each formed into a sheet shape. The anode body, the cathode body, and the separator are winded into a roll shape in an overlapped state.

Case 3 has a bottomed cylinder shape including opening part 31 at an end in the axial direction (a lower end in FIG. 1). Case 3 houses capacitor element 11. Case 3 is made of, for example, at least one material or an alloy of at least two materials selected from a group consisting of aluminum, stainless steel, copper, iron, and brass.

Opening part 31 of case 3 is closed by closing part 4. Closing part 4 has a disc shape. Closing part 4 is made of, for example, a rubber material such as ethylene-propylene terpolymer (EPT) or isobutylene-isoprene rubber (IIR), or a resin material such as an epoxy resin.

On case 3, a portion around opening part 31 is drawn inward of case 3. Therefore, closing part 4 provided in case 3 is secured to case 3.

Figure 3:
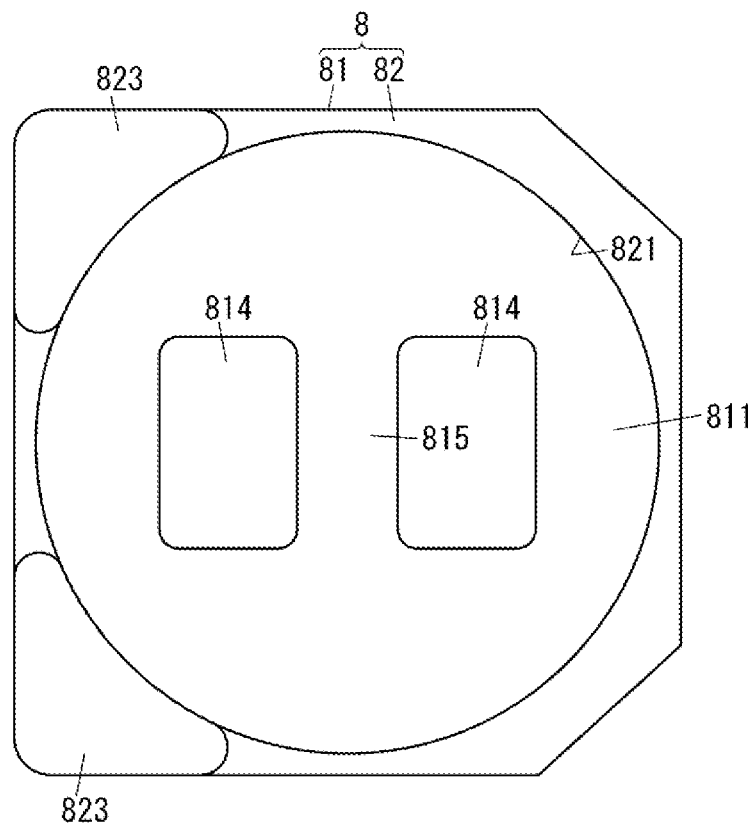
FIG. 3 is a plan view illustrating the seat plate of the electrolytic capacitor.
Figure 4:
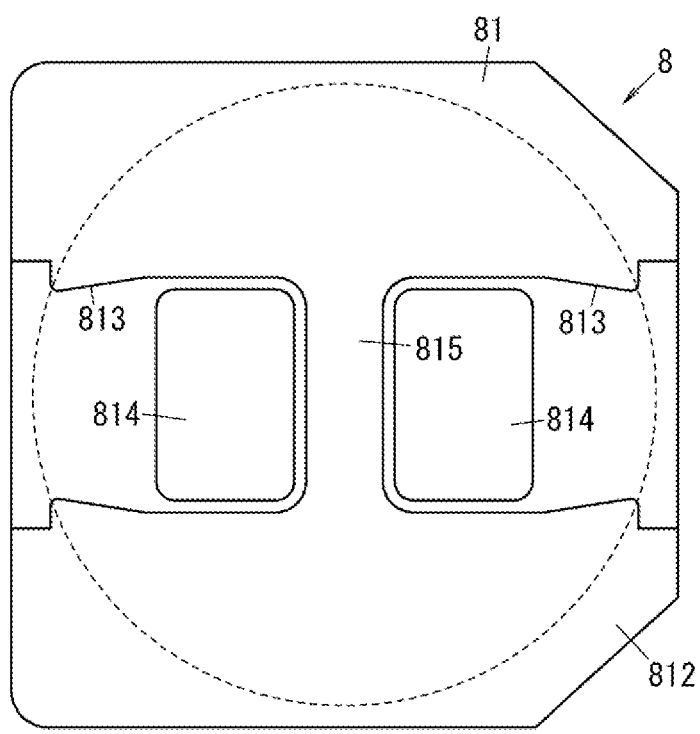
FIG. 4 is a bottom view illustrating the seat plate of the electrolytic capacitor.

Seat plate 8 has electrical insulation properties. Seat plate 8 is made of a resin material, for example. As illustrated in FIGS. 1, 3, and 4, seat plate 8 includes base 81 and edge part 82. Base 81 has a square shape, in which each of two corners among four corners of base 81 is chamfered. The two corners are on a right side of base 81 as illustrated in FIG. 3. Base 81 faces closing part 4 in the axial direction of case 3. At an edge of base 81, edge part 82 projects from base 81 of a plate shape, in a direction perpendicular to a main surface of base 81. Inner peripheral surface 821 of edge part 82 constitutes a circular shape. Case 3 is mounted on base 81 in a state where an end part of case 3, which is closer to opening part 31, is housed inside the circular shape of inner peripheral surface 821 of edge part 82.

In base 81, a surface abutting case 3 is referred to as first surface 811. A surface opposite to first surface 811 in a thickness direction of base 81 is referred to as second surface 812. Base 81 includes a pair of groove parts 813 on second surface 812. The pair of groove parts 813 respectively extend in a direction intersecting the thickness direction of base 81 (left-right directions on a paper sheet in FIG. 1). An example of a depth of each of the pair of groove parts 813 (a depth in a thickness direction of seat plate 8) ranges from 0.2 mm to 0.3 mm, inclusive.

Furthermore, base 81 includes a pair of through holes 814. The pair of through holes 814 respectively correspond to the pair of groove parts 813 one to one. The pair of through holes 814 are respectively formed on corresponding bottom surfaces of groove parts 813 to pass through base 81 in the thickness direction. The pair of through holes 814 each have a rectangular shape. A short-side direction of each of the pair of through holes 814 corresponds to a direction in which the pair of through holes 814 are aligned (left-right directions on a paper sheet of FIG. 4).

An outer peripheral shape of edge part 82 is a square shape conforming to an outer peripheral shape of base 81. In edge part 82, portions corresponding to two corners (a left upper corner and a left lower corner in FIG. 3) are respectively formed with projection parts 823. That is, edge part 82 has two projection parts 823. With respect to a main surface of base 81, a projection length of each of two projection parts 823 is greater than a projection length of a portion other than projection parts 823 of edge part 82.

As illustrated in FIG. 1, the pair of lead tabs 12 are at least partially buried in closing part 4. The pair of lead tabs 12 respectively correspond to the pair of lead members 5 one to one. The pair of lead tabs 12 are respectively electrically connected to corresponding lead members 5. One of the pair of lead tabs 12 is electrically connected to the anode body of capacitor element 11. Another one of the pair of lead tabs 12 is electrically connected to the cathode body of capacitor element 11.

Respective drawn parts 6 of the pair of lead members 5 pass through closing part 4 to protrude from closing part 4 to outside. The pair of through holes 814 of base 81 respectively correspond to the pair of lead members 5 one to one. The pair of lead members 5 protruded from closing part 4 respectively pass through corresponding through holes 814.

The pair of lead members 5 respectively further include extended parts 7. Extended parts 7 respectively extending from drawn parts 6 are exposed to outside of case 3. When viewed in the axial direction of case 3, each of extended parts 7 extends from a position away from center C1 of corresponding drawn part 6 (see FIG. 5). More specifically, in one of the pair of lead members 5, extended part 7 extends from a portion of an end of drawn part 6, which is close to another one of lead members 5 in the left-right direction (the direction in which the pair of lead members 5 are aligned). In each of drawn parts 6, a portion near extended part 7 is tapered toward extended part 7. When viewed in the axial direction of case 3, in here, drawn parts 6 each have a circular shape. Center C1 of each of drawn parts 6 when viewed in the axial direction of case 3 corresponds to a center of the circular shape.

A thickness of each of extended parts 7 is smaller than width L1 of each of drawn parts 6 (see FIG. 2). As described above, an example of width L1 of each of drawn parts 6 is 0.8 mm. An example of the thickness of each of extended parts 7 ranges from 0.2 mm to 0.3 mm inclusive. As the thickness of each of extended parts 7, there are thickness L3 of each of first portions 71 and thickness L32 of each of second portions 72, as described below. Thickness L3 of each of first portions 71 and thickness L32 of each of second portions 72 are both thinner than the thickness of each of drawn parts 6.

Each of extended parts 7 includes first portion 71 and second portion 72. First portion 71 has a thickness in the direction in which the pair of lead members 5 are aligned (the left-right directions on the paper sheet in FIG. 1). First portion 71 extend from drawn part 6 in the axial direction of case 3. First portion 71 pass through a corresponding one of through holes 814 of base 81. Second portion 72 has a thickness in a direction along with the axial direction of case 3. Thickness L3 of first portion 71 is smaller than thickness L32 of second portion 72. Second portion 72 extends from first portion 71 in a direction intersecting the axial direction of case 3 (the left-right directions on the paper sheet in FIG. 1). In here, electrolytic capacitor 1 is a chip capacitor implementable on a surface of a substrate. Therefore, second portions 72 correspond to portions electrically connected to conductors on the substrate.

Figure 5:
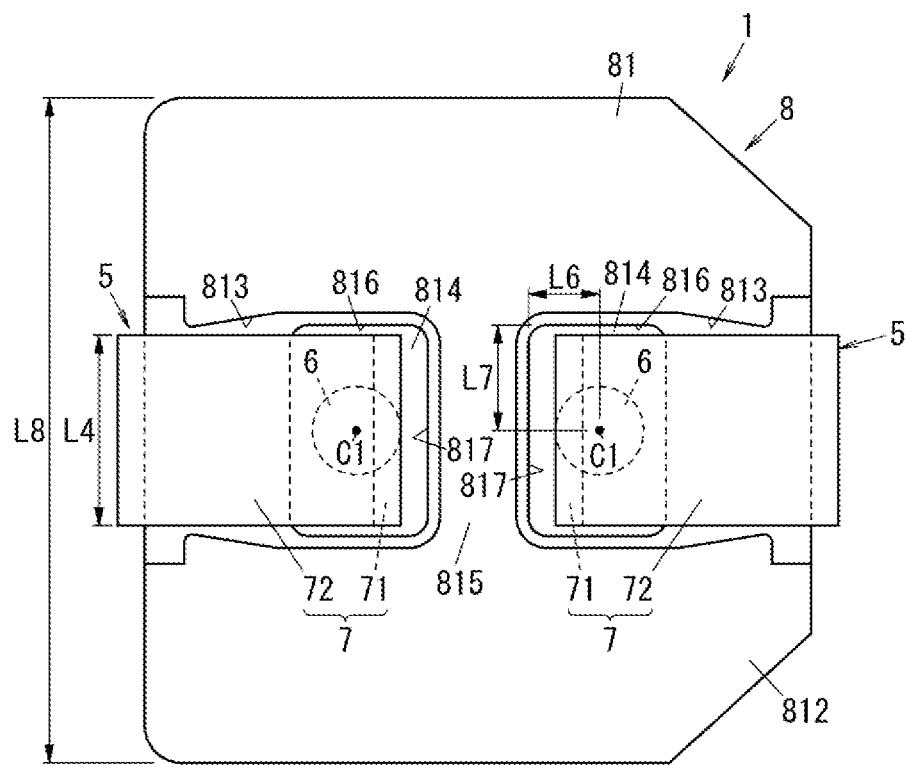
FIG. 5 is a bottom view illustrating the electrolytic capacitor.

The pair of lead members 5 respectively correspond to the pair of groove parts 813 of base 81 one to one. As illustrated in FIG. 5, second portions 72 of the pair of lead members 5 respectively pass through corresponding groove parts 813. That is, second portion 72 of each of the pair of lead members 5 project from first portion 71 to extend along corresponding groove part 813. Two second portions 72 respectively extend in directions opposite to each other. That is, two second portions 72 respectively extend in directions away from a center of base 81. Thickness L32 of each of second portions 72 is equal to or smaller than a depth of each of groove parts 813. In here, thickness L32 of each of second portions 72 may be approximately identical to the depth of each of groove parts 813. In the meantime, thickness L32 of each of second portions 72 may be greater than the depth of each of groove parts 813 as long as ease of implementation is not impaired.

Exterior member 2 is supported by seat plate 8. More specifically, exterior member 2 is supported by seat plate 8 so that base 81 of seat plate 8 is pinched between exterior member 2 and second portions 72 of the pair of lead members 5. Since second portions 72 are respectively disposed in the pair of groove parts 813 of base 81, exterior member 2 is regulated from rotating.

In each of lead members 5, drawn part 6 and extended part 7 are integrally formed. More specifically, a conductive material having a circular column shape (bar shape), from which lead member 5 is to be formed, is partially compressed. The compressed portion thus has a plate shape. For example, a diameter of the conductive material is 0.8 mm. Furthermore, the compressed portion having a plate shape is bent around at a boundary between first portion 71 and second portion 72. Thus, extended part 7 is formed. The compressed portion, which is formed as extended part 7, has a thickness smaller than a thickness of a portion that is not compressed, which is formed as drawn part 6.

In a direction orthogonal to both the axial direction of case 3 and a longitudinal direction of second portion 72 (upper-lower direction on a paper sheet in FIG. 2), width L4 of extended part 7 (see FIG. 2) is two times or more of width L1 of drawn part 6 (see FIG. 2). As described above, width (diameter) L1 of drawn part 6 is 0.8 mm, for example. For example, width L4 of extended part 7 ranges from 1.6 mm to 2.1 mm, inclusive. As already described above, extended part 7 is formed by partially compressing the conductive material having a circular column shape (bar shape), from which lead members 5 are to be formed. More specifically, thickness L3 (and L32) of extended part 7 decreases as width L4 of extended part 7 becomes long when the conductive material is compressed in the thickness direction (left-right directions on the paper sheet in FIG. 2). Therefore, by increasing width L4 of extended part 7, compared with width L1 of drawn part 6, thickness L3 (and L32) of extended part 7 can be decreased. In particular, thickness L32 of second portion 72 of extended part 7 can be made relatively thinner. Therefore, electrolytic capacitor 1 can be decreased in length in the thickness direction of base 81.

Width L4 of extended part 7 is 0.25 times or more of width L8 of seat plate 8 in a width direction of extended part 7 (see FIG. 5).

When electrolytic capacitor 1 is to be mounted on a substrate, second portions 72 of extended parts 7 are respectively soldered to conductors on the substrate and are electrically and mechanically connected. By making width L4 of each of second portions 72 relatively larger, areas of connecting parts between the substrate and electrolytic capacitor 1 can be made relatively larger. Hence, even when a center of gravity of electrolytic capacitor 1 is relatively far from the substrate because length L5 of case 3 in the axial direction of case 3 (see FIG. 1) is relatively long, electrolytic capacitor 1 can be stably fixed to the substrate. In electrolytic capacitor 1 according to the exemplary embodiment, as illustrated in FIG. 1, length L5 of case 3 in the axial direction of case 3 is 1.4 times or more of a diameter of case 3 (diameter L2 of exterior member 2). An example of length L5 is 10.5 mm. As described above, diameter L2 of exterior member 2 is 6.3 mm, for example.

As illustrated in FIG. 5, base 81 of seat plate 8 includes partition wall 815. Partition wall 815 corresponds to a portion between the pair of through holes 814. Partition wall 815 has a plate shape. Partition wall 815 includes a part of inner surface 816 of each of the pair of through holes 814 and is located between the pair of through holes 814 to separate through holes 814 from each other. More specifically, both surfaces of partition wall 815 in the thickness direction of partition wall 815 (left-right direction on a paper sheet in FIG. 5) serve as flat surfaces 817 each having a planar shape. Each of two flat surfaces 817 is identical to the part of inner surface 816 of each of the pair of through holes 814. A thickness of partition wall 815 (a thickness equivalent to distance L9, described later) is 1.0 mm, for example.

Drawn part 6 of each of the pair of lead members 5 satisfy a relationship described below. Distance L6 between partition wall 815 and center C1 of drawn part 6 in the direction in which the pair of through holes 814 are aligned (the alignment direction) is shorter than distance L7 between inner surface 816 of through hole 814 and center C1 of drawn part 6 in the direction orthogonal to the alignment direction, when viewed in the axial direction of case 3. That is, seat plate 8 is attached to capacitor main body 10 to allow distance L6 to be smaller than distance L7. For example, distance L6 is 0.7 mm, and distance L7 is 1.2 mm.

With electrolytic capacitor 1 according to the exemplary embodiment, compared with a case where distance L6 and distance L7 has a reverse relationship between them in size with respect to the relationship in the exemplary embodiment, partition wall 815 has large thickness. Hence, strength of partition wall 815 can be improved.

Figure 6:
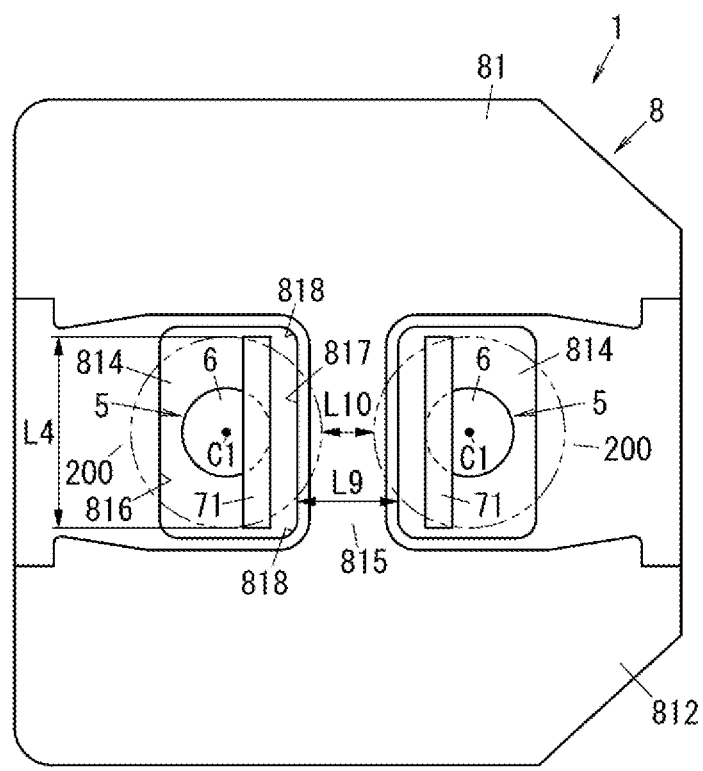
FIG. 6 is a bottom view illustrating the electrolytic capacitor, from which the second portions are omitted.

FIG. 6 illustrates electrolytic capacitor 1 from which second portions 72 of extended parts 7 are omitted from illustration. As illustrated in FIG. 6, when virtual circle 200 is defined as a circle having a center identical to center C1 of drawn part 6 and a diameter having the same length as width L4 of extended part 7, virtual circle 200 partially overlap with partition wall 815, when viewed in the axial direction of case 3. That is, seat plate 8 is attached to capacitor main body 10 so that virtual circle 200 partially overlaps with partition wall 815. Compared with a case where virtual circle 200 does not overlap with partition wall 815, partition wall 815 has large thickness. Hence, strength of partition wall 815 can be improved. Further, the surface of partition wall 815 constitute inner surface 816 of through hole 814, and serve as flat surface 817 having a planar shape. Hence, compared with a case where the surface of partition wall 815 is formed along virtual circle 200 instead of flat surface 817, the thickness of partition wall 815 can be increased.

In through hole 814 having a rectangular shape, two corners 818 respectively adjacent to flat surface 817 are located outside of virtual circle 200. Distance L9 between the pair of through holes 814 is equal to or shorter than a radius of virtual circle 200. When two virtual circles 200 are respectively rendered around drawn parts 6 of the pair of lead members 5, shortest distance L10 between two virtual circles 200 is shorter than a radius of each of virtual circles 200. Two virtual circles 200 may abut each other.

In a cross section taken along a plane perpendicular to the axial direction of case 3, an opening area of each of the pair of through holes 814 is three times or more of a cross sectional area of drawn part 6, which is included in lead member 5 passing through corresponding through hole 814. That is, the opening area of one of the pair of through holes 814 is three times or more of the cross sectional area of drawn parts 6 passing through the one of the pair of through holes 814. The opening area of another one of through holes 814 is three times or more of the cross sectional area of drawn part 6 of lead members 5. In the exemplary embodiment, the opening areas of the pair of through holes 814 are respectively identical to each other. The cross sectional areas of drawn parts 6 of the pair of lead members 5 are respectively substantially identical to each other.

(2) Configuration of Comparative Example

Figure 7:
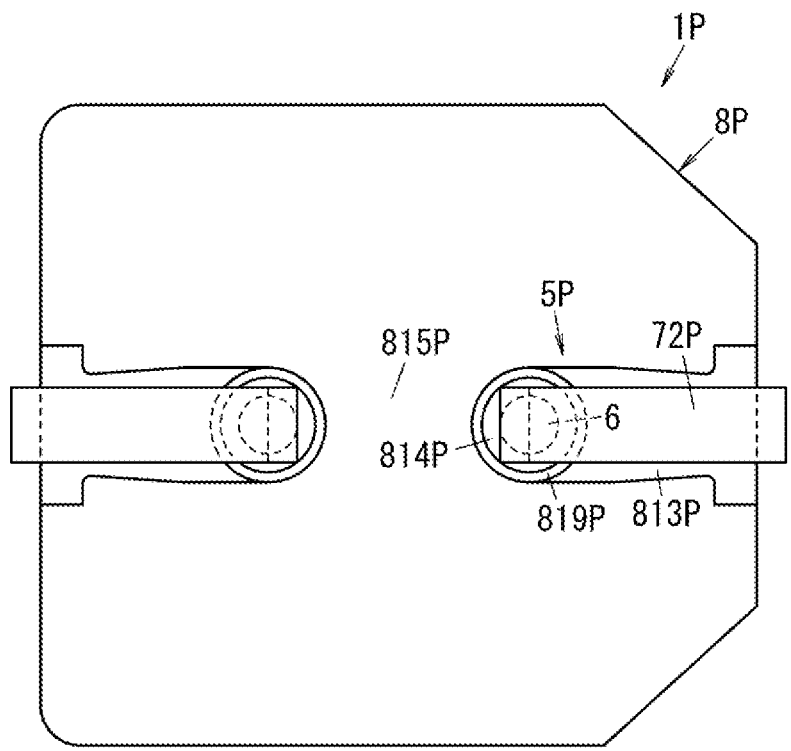
FIG. 7 is a bottom view illustrating an electrolytic capacitor according to a comparative example.

Next, electrolytic capacitor 1P according to a comparative example illustrated in FIG. 7 will now be described herein. Components common in configuration to the components of electrolytic capacitor 1 according to the exemplary embodiment are omitted from description.

In seat plate 8P of electrolytic capacitor 1P, a pair of through holes 814P are each formed into a circular shape. Partition wall 815P is provided between the pair of through holes 814P. Hence, in an inner surface of through hole 814P, a part of the inner surface which constitutes partition wall 815P is a surface having a concave shape. Grooves 819P each having a circular shape are respectively formed around through holes 814P. Each of grooves 819P is connected to groove part 813P extending in the left-right direction.

Lead member 5P is made from a wire material (conductive material having a bar shape) having a small diameter, compared with the wire material (the conductive material having a bar shape) serving as the material of lead members 5 according to the exemplary embodiment. In here, in order to decrease the ESR of electrolytic capacitor 1P, it is conceivable that a wire material having a large diameter be used as a material of lead members 5P.

If, in electrolytic capacitor 1P according to the comparative example, a wire material having a large diameter is used as a material of lead members 5P, a diameter of each of the pair of through holes 814P must be increased. Thus, a thickness of partition wall 815P between the pair of through holes 814P may possibly become small to be insufficient. That is, the thickness of partition wall 815P in the direction in which the pair of through holes 814P are aligned becomes thin. Partition wall 815P may thus be possible to become insufficient in strength. Therefore, with the configuration of electrolytic capacitor 1P according to the comparative example, it is difficult to increase a diameter of each of drawn parts 6P by using a wire material having a large diameter as a material of lead members 5P.

In contrast, electrolytic capacitor 1 according to the exemplary embodiment has adopted the configuration allowing the thickness of partition wall 815 to be easily secured (see FIG. 5). Specifically, in electrolytic capacitor 1, distance L6 between partition wall 815 and center C1 of drawn part 6 in the direction in which the pair of through holes 814 are aligned (the alignment direction) is shorter than distance L7 between inner surface 816 of through holes 814 and center C1 of drawn part 6 in the direction orthogonal to the alignment t direction, when viewed in the axial direction of case 3. With the configuration of the exemplary embodiment, even when an area of each of the pair of through holes 814 is increased, the thickness of partition wall 815 would therefore be less likely to become thin. That is, in partition wall 815, a part of inner surface 816 of each of through holes 814 serve as flat surface 817 having a planar shape. Compared with a case where the surface having a concave shape are provided instead of flat surfaces 817 as described in the comparative example, distance L6 between partition wall 815 and center C1 of drawn part 6 thus becomes short.

In electrolytic capacitor 1 according to the exemplary embodiment, a wire material having a large diameter is used as a material of lead members 5, compared with the comparative example. A compression ratio of each of extended parts 7 of lead members 5 is thus increased, compared with the comparative example. Therefore, thickness L3 (and L32) of each of extended parts 7 is made approximately identical to the thickness adopted in the comparative example. As the compression ratio of each of extended parts 7 increases, width L4 of each of extended parts 7 increases, compared with the comparative example. The width of each of through holes 814 and groove parts 813 are accordingly further increased.

(3) Manufacturing Method

Next, an example of a manufacturing method for electrolytic capacitor 1 will now be described with reference to FIGS. 8A to 8E.

Figure 8A:
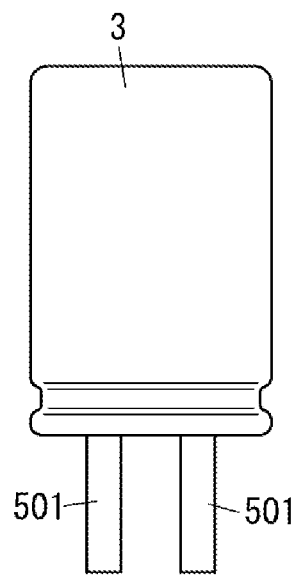
FIGS. 8A to 8E are views for describing a manufacturing method for the electrolytic capacitor according to the exemplary embodiment.

FIG. 8A illustrates a state before capacitor main body 10 is attached to seat plate 8. A pair of bar shape members 501 are projecting from case 3. The pair of bar shape members 501 are conductive materials from which the pair of lead members 5 are to be formed.

Figure 8B:
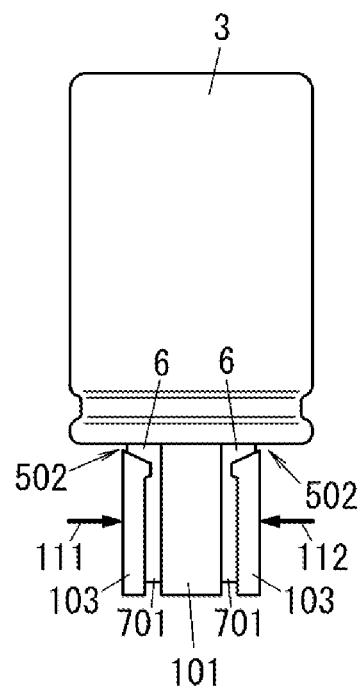

The pair of bar shape members 501 are respectively partially pressed into a plate shape. The pair of bar shape members 501 are thus processed into lead base materials 502, as illustrated in FIG. 8B. Lead base materials 502 respectively include terminal members 701 and drawn parts 6. Extended parts 7 are to be formed from terminal members 701. Terminal member 701 is a portion formed into a plate shape through press working. That is, terminal member 701 corresponds to a portion formed by partially compressing bar shape member 501. Terminal members 701 respectively extend from drawn parts 6. In the process, core 101 is disposed between the pair of bar shape members 501. Furthermore, a pair of sliders 103 are disposed to allow the pair to correspond to the pair of bar shape members 501 one to one. That is, the pair of bar shape members 501 are respectively disposed between core 101 and corresponding sliders 103. As illustrated by two arrows 111, 112 in FIG. 8B, sliders 103 are slid toward core 101. When the pair of bar shape members 501 are respectively compressed between core 101 and corresponding sliders 103, lead base materials 502 are formed.

Figure 8C:
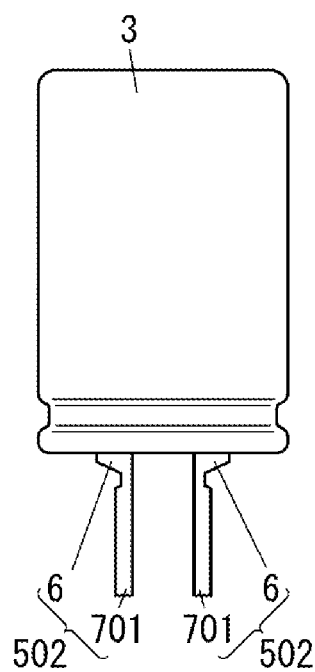

After that, as illustrated in FIG. 8C, the pair of sliders 103 are respectively slid and removed from the pair of lead base materials 502. Core 101 is then extracted from the pair of lead base materials 502.

Figure 8D:
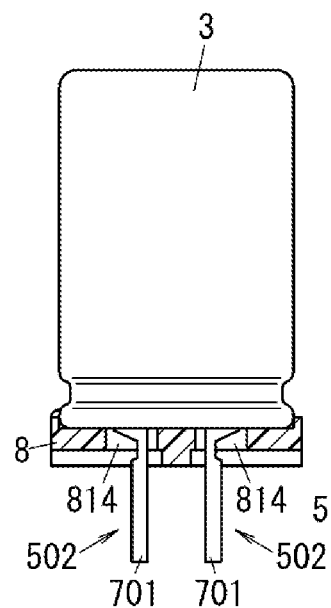
Figure 8E:
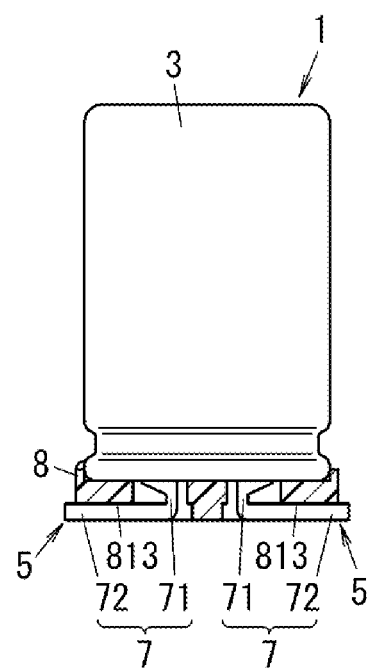

Next, as illustrated in FIG. 8D, the pair of lead base materials 502 are respectively inserted into the pair of through holes 814 of seat plate 8 to place case 3 on seat plate 8. Furthermore, the pair of lead base materials 502 are bent to form the pair of lead members 5, as illustrated in FIG. 8E. That is, the pair of lead base materials 502 are respectively bent to allow portions, respectively pulled out of through holes 814, of the pair of lead base materials 502 to pass through groove parts 813.

With the process described above, electrolytic capacitor 1 is manufactured.

First Modification Example

Next, electrolytic capacitor 1A according to a first modification example will now be described with reference to FIG. 9. Components similar in configuration to those in the exemplary embodiment are given identical reference signs, and description of such elements is omitted as appropriate.

Figure 9:
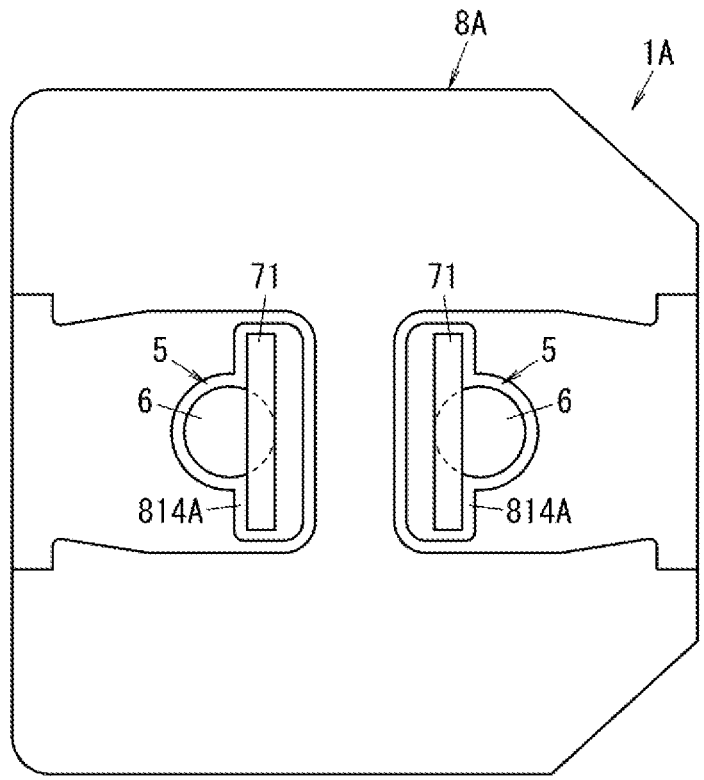
FIG. 9 is a bottom view illustrating an electrolytic capacitor according to a first modification example, from which second portions are omitted.

In FIG. 9, second portions 72 of extended parts 7 are omitted from illustration. In electrolytic capacitor 1A according to the first modification example, through holes 814A formed on seat plate 8A differ in shape from through holes 814 according to the exemplary embodiment. When viewed in the thickness direction of seat plate 8A, through holes 814A each have a shape where a hole having a rectangular shape and a hole having a semicircular shape join each other. The hole having a rectangular shape conforms to each of first portions 71 of extended parts 7, and the hole having a semicircular shape conforms to each of drawn parts 6. That is, through holes 814A each have a shape conforming to a shape of each of lead members 5.

When one of lead members 5 is about to rotate in a state where lead members 5 are respectively inserted into through holes 814A, corresponding one of first portions 71 comes into contact with corresponding one of inner surfaces of through holes 814A. The one of lead members 5 may thus be regulated from rotating. In here, around both ends in a width direction (upper-lower directions on a paper sheet in FIG. 9) of each of first portions 71, a width of each of through holes 814A in a direction in which the pair of through holes 814A are aligned (left-right directions on the paper sheet in FIG. 9) is smaller, compared with the exemplary embodiment. Therefore, lead members 5 can further be regulated from rotating, compared with a case where through holes 814 are each formed into a rectangular shape, as described in the exemplary embodiment. Therefore, exterior member 2 (see FIG. 1) is regulated from rotating together with lead members 5. That is, electrolytic capacitor 1A includes, in regions respectively facing lead members 5, rotation regulation structures configured to regulate capacitor main body 10 (lead members 5 and exterior member 2) from rotating. In the first modification example, the rotation regulation structures correspond to the shapes of through holes 814A.

The rotation regulation structures may be members respectively provided in through holes 814 according to the exemplary embodiment (see FIG. 6). In this case, the members respectively serving as the rotation regulation structures are respectively provided adjacent to first portions 71 of extended parts 7, for example. When one of lead members 5 is about to rotate in corresponding one of through holes 814, the one of lead members 5 comes into contact with corresponding one of the members serving as the rotation regulation structures, regulating the one of lead members 5 from rotating. Exterior member 2 is accordingly regulated from rotating together with lead members 5.

Through holes 814A are not limited to each have a shape where a hole having a rectangular shape conforming to each of first portions 71 of extended parts 7 and a hole having a semicircular shape conforming to each of drawn parts 6 join each other. Through holes 814A may each have a shape where two or more holes varying in shape, such as rectangular, square, semicircular, circular, and ellipse, join each other. It is preferable that two or more holes each include a hole conforming to each of first portions 71 of extended parts 7 and a hole conforming to each of drawn parts 6.

Second Modification Example

Next, electrolytic capacitor 1B according to a second modification example will now be described with reference to FIG. 10. Components similar in configuration to those in the exemplary embodiment are given identical reference signs, and description of such elements is omitted as appropriate.

Figure 10:
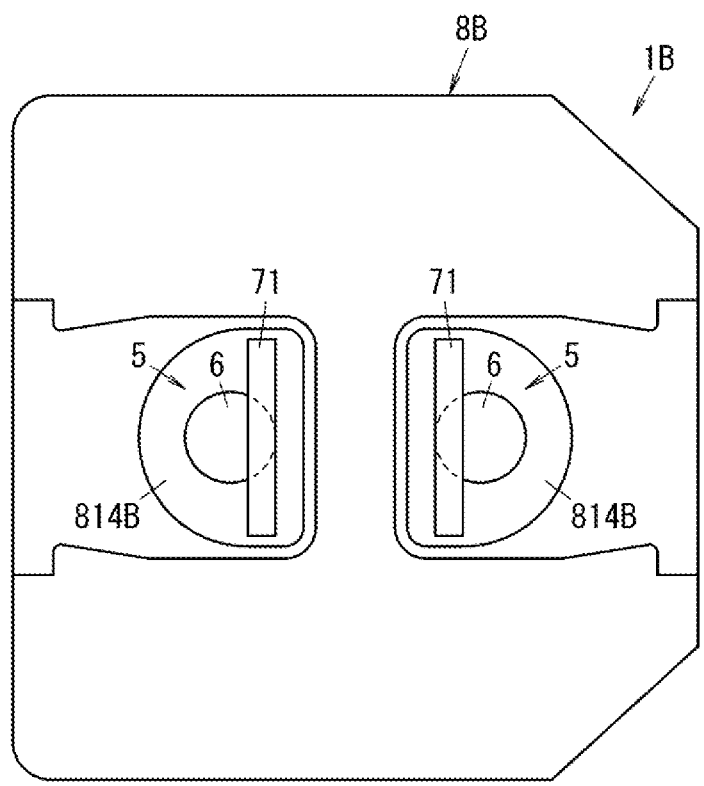
FIG. 10 is a bottom view illustrating an electrolytic capacitor according to a second modification example, from which second portions are omitted.

In FIG. 10, second portions 72 of extended parts 7 are omitted from illustration. In electrolytic capacitor 1B according to the second modification example, through holes 814B formed on seat plate 8B differ in shape from through holes 814 according to the exemplary embodiment. Through holes 814B each have a D-shape when viewed in the thickness direction of seat plate 8B. That is, through holes 814B each have a shape combined with a semicircular shape and a rectangular shape, when viewed in the thickness direction of seat plate 8B.

Other Modification Examples to the Exemplary Embodiment

Hereinafter, other modification examples to the exemplary embodiment will now be described. The modification examples described below may be achieved in an appropriately combined manner.

Electrolytic capacitor 1 may at least include the pair of (two) lead members 5. Electrolytic capacitor 1 may include three or more lead members 5.

Electrolytic capacitor 1 may not include seat plate 8.

Lead members 5 are not limited to each have a shape bent for surface mount. Lead members 5 may each have a linear shape. That is, electrolytic capacitor 1 may be a so-called radial lead type electrolytic capacitor.

Electrolytic capacitor 1 may include a plurality of capacitor elements 11.

Through holes 814 are not limited to each have one of the shapes illustrated in the exemplary embodiment or the first, second modification examples. For example, through holes 814 may each have a shape where at least one of the four corners of each of through holes 814 each having a rectangular shape illustrated in the exemplary embodiment is chamfered.

As for case 3 having a circular column shape, the circular column shape may have a bottom surface where the circular shape is partially cut away. For example, the circular column shape may have a bottom surface having a substantially D-shape. The circular column shape may otherwise have a bottom surface having an elliptical shape. In a case where case 3 has a shape that is not a circular column shape in a strict sense, as described above, a maximum width of case 3, when viewed in the axial direction, corresponds to a diameter of exterior member 2.

Case 3 may have another shape than a circular column shape. For example, case 3 may have a rectangular column shape.

SUMMARY

Aspects described below are disclosed, based on the exemplary embodiment and other examples describe above.

Electrolytic capacitor 1 (or 1A, 1B) according to a first aspect includes capacitor main body 10. Capacitor main body 10 includes exterior member 2 and the pair of lead members 5. Exterior member 2 includes case 3 and closing part 4. Case 3 has a hollow column shape. Case 3 includes opening part 31 at the end in the axial direction of the hollow column shape. Closing part 4 closes opening part 31. The pair of lead members 5 each include drawn part 6 having a bar shape. Drawn part 6 is exposed from closing part 4. When viewed in the axial direction, width L1 of drawn part 6 is 0.1 times or more of diameter L2 of exterior member 2.

With the configuration described above, the ESR of electrolytic capacitor 1 (or 1A, 1B) can be easily decreased, compared with a case where width L1 of each of drawn parts 6 is less than 0.1 times of diameter L2 of exterior member 2, when viewed in the axial direction of case 3.

In electrolytic capacitor 1 (or 1A, 1B) according to a second aspect, the pair of lead members 5 according to the first aspect respectively further each include extended part 7. Extended part 7 is connected to drawn part 6. Extended part 7 has thickness L3 (and L32) smaller than width L1 of drawn part 6. Width L4 of extended part 7 is two times or more of width L1 of drawn part 6.

With the configuration described above, thickness L3 (and L32) of each of extended parts 7 can be decreased when width L4 of each of extended parts 7 is increased compared with width L1 of each of drawn parts 6, in a case where a cross sectional area of each of extended parts 7 is specified.

In electrolytic capacitor 1 (or 1A, 1B) according to a third aspect, seat plate 8 (or 8A, 8B) is further included in the second aspect. Seat plate 8 (or 8A, 8B) is attached to capacitor main body 10. Seat plate 8 (or 8A, 8B) includes the pair of through holes 814 (or 814A, 814B) and partition wall 815. The pair of through holes 814 (or 814A, 814B) respectively allow the pair of lead members 5 to pass through. Partition wall 815 includes a part of inner surface 816 of each of the pair of through holes 814 (or 814A, 814B). Partition wall 815 is located the pair of through holes 814 (or 814A, 814B). When viewed in the axial direction, virtual circle 200 partially overlap with partition wall 815. Virtual circle 200 has a center identical to center C1 of drawn part 6. Virtual circle 200 has a diameter having same length as width L4 of extended part 7.

With the configuration described above, partition wall 815 has a large thickness, compared with a case where virtual circle 200 does not overlap with partition wall 815. Partition wall 815 can be accordingly improved in strength.

In electrolytic capacitor 1 (or 1A, 1B) according to a fourth aspect, seat plate 8 (or 8A, 8B) is further included in the second or third aspect. Seat plate 8 (or 8A, 8B) is attached to capacitor main body 10. Seat plate 8 (or 8A, 8B) includes the pair of through holes 814 (or 814A, 814B). The pair of through holes 814 (or 814A, 814B) respectively allow the pair of lead members 5 to pass through. Extended part 7 includes a portion (first portion 71) passing through a corresponding one of the pair of through holes 814 (or 814A, 814B). In a cross section taken along a plane perpendicular to the axial direction of case 3, an opening area of each of the pair of through holes 814 (or 814A, 814B) is three times or more of a cross sectional area of drawn part 6.

With the configuration described above, lead members 5 can respectively easily pass through through holes 814 (or 814A, 814B), compared with a case where an opening area of each of the pair of through holes 814 (or 814A, 814B) is less than three times of a cross sectional area of each of drawn parts 6.

In electrolytic capacitor 1 (or 1A, 1B) according to a fifth aspect, seat plate 8 (or 8A, 8B) is further included in any one of the first to fourth aspects. Seat plate 8 (or 8A, 8B) is attached to capacitor main body 10. Seat plate 8 (or 8A, 8B) includes the pair of through holes 814 (or 814A, 814B) and partition wall 815. The pair of through holes 814 (or 814A, 814B) respectively allow the pair of lead members 5 to pass through. Partition wall 815 includes a part of inner surfaces 816 of each of the pair of through holes 814 (or 814A, 814B). Partition wall 815 is located between the pair of through holes 814 (or 814A, 814B). Distance L6 between partition wall 815 and center C1 of drawn part 6 in the alignment direction in which the pair of through holes 814 are aligned is shorter than distance L7 between inner surface 816 of a corresponding one of the pair of through holes 814 and center C1 of drawn part 6 in the direction orthogonal to the alignment direction, when viewed in the axial direction of case 3.

With the configuration described above, partition wall 815 is greater in thickness, compared with a case where the size relationship between distance L6 and distance L7 is reversed, improving partition wall 815 in strength. In electrolytic capacitor 1 (or 1A, 1B) according to a sixth aspect, seat plate 8 (or 8A, 8B) is further included in any one of the first to fifth aspects. Seat plate 8 (or 8A, 8B) is attached to capacitor main body 10. Seat plate 8 (or 8A, 8B) includes the pair of through holes 814 (or 814A, 814B) and partition wall 815. The pair of through holes 814 (or 814A, 814B) respectively allow the pair of lead members 5 to pass through. Partition wall 815 includes a part of inner surface 816 of each of the pair of through holes 814 (or 814A, 814B). Partition wall 815 is located between the pair of through holes 814 (or 814A, 814B). Partition wall 815 includes flat surface 817 having a planar shape. Flat surface 817 is provided as a part of inner surface 816 of one of the pair of through holes 814 (or 814A, 814B).

With the configuration described above, a thickness of partition wall 815 can be easily secured, compared with a case where partition wall 815 has surfaces each having an arc shape, for example, instead of flat surfaces 817.

In electrolytic capacitor 1A according to a seventh aspect, seat plate 8 (or 8A, 8B) is further included in any one of the first to sixth aspects. Seat plate 8 (or 8A, 8B) is attached to capacitor main body 10. Seat plate 8 (or 8A, 8B) includes the pair of through holes 814 (or 814A, 814B) and rotation regulation structure. The pair of through holes 814 (or 814A, 814B) respectively allow the pair of lead members 5 to pass through. The rotation regulation structures is provided in a region facing a corresponding one of the pair of lead members 5 to regulate capacitor main body 10 from rotating.

With the configuration described above, capacitor main body 10 can be stably held, compared with a case where no rotation regulation parts are provided.

In electrolytic capacitor 1 (or 1A, 1B) according to an eighth aspect, length L5 of case 3 in the axial direction is 1.4 times or more of a diameter of case 3 (diameter L2 of exterior member 2) in any one of the first to seventh aspects.

With the configuration described above, a length in the axial direction of each of members (e.g., an anode foil and a cathode foil) housed in exterior member 2 can be extended longer, compared with a case where length L5 of case 3 in the axial direction is less than 1.4 times of a diameter of case 3. Therefore, the ESR of electrolytic capacitor 1 (or 1A, 1B) can be decreased.

The other configurations than the configuration of the first aspect are not necessary for electrolytic capacitor 1 (or 1A, 1B), and can be appropriately omitted.

Seat plate 8 (or 8A, 8B) according to a ninth aspect is provided to electrolytic capacitor 1 (or 1A, 1B). Electrolytic capacitor 1 (or 1A, 1B) includes capacitor main body 10. Capacitor main body 10 includes exterior member 2 and the pair of lead members 5. Exterior member 2 includes case 3 and closing part 4. Case 3 has a hollow column shape. Case 3 includes opening part 31 at the end in the axial direction of the hollow column shape. Closing part 4 closes opening part 31. The pair of lead members 5 each include drawn part 6 having a bar shape. Drawn part 6 is exposed from closing part 4. When viewed in the axial direction, width L1 of drawn parts 6 is 0.1 times or more of diameter L2 of exterior member 2. The pair of lead members 5 further each include extended part 7. Extended part 7 is connected to drawn part 6. Extended part 7 has thickness L3 (and L32) smaller than width L1 of each of drawn parts 6. Seat plate 8 (or 8A, 8B) includes the pair of through holes 814 (or 814A, 814B) and partition wall 815. The pair of through holes 814 (or 814A, 814B) respectively allow the pair of lead members 5 to pass through. Partition wall 815 includes a part of inner surface 816 of each of the pair of through holes 814 (or 814A, 814B). Partition wall 815 is located between the pair of through holes 814 (or 814A, 814B). Seat plate 8 (or 8A, 8B) is attached to capacitor main body 10 so that, when viewed in the axial direction, virtual circle 200 to partially overlap with partition wall 815. Virtual circle 200 has a center identical to center C1 of drawn part 6. Virtual circle 200 has a diameter having same length as width L4 of extended part 7.

With the configuration described above, partition wall 815 has a large thickness, compared with a case where virtual circle 200 does not overlap with partition wall 815. Partition wall 815 can be accordingly improved in strength.

What is claimed is:

1. An electrolytic capacitor comprising:
   a capacitor main body; and
   a seat plate attached to the capacitor main body, wherein:
   the capacitor main body including:
   an exterior member including a case and a closing part, the case having a hollow column shape and including an opening part at an end in an axial direction of the hollow column shape, the closing part closing the opening part, and
   a pair of lead members each including a drawn part exposed from the closing part, the drawn part having a bar shape,
   when viewed in the axial direction, a width of the drawn part is 0.1 times or more of a diameter of the exterior member,
   the pair of lead members each further include an extended part connected to the drawn part, the extended part having a thickness smaller than the width of the drawn part,
   when viewed in the axial direction, a center of the extended part in a thickness direction is located at a position that is away from a center of the drawn part and is closer to a center of the case than the center of the drawn part is,
   the seat plate has a pair of through holes respectively allowing the pair of lead members to pass through, and
   when viewed in the axial direction, a distance between the pair of through holes is equal to or shorter than a radius of a virtual circle, the virtual circle having a center identical to the center of the drawn part and a diameter having same length as the width of the extended part.

2. The electrolytic capacitor according to claim 1, wherein a width of the extended part is two times or more of the width of the drawn part.

3. The electrolytic capacitor according to claim 1, wherein:
   the seat plate includes a partition wall including a part of an inner surface of each of the pair of through holes and being located between the pair of through holes, and
   when viewed in the axial direction, the virtual circle partially overlaps with the partition wall.

4. The electrolytic capacitor according to claim 1, wherein:
   the extended part includes a portion passing through a corresponding one of the pair of through holes, and
   in a cross section taken along a plane perpendicular to the axial direction, an opening area of each of the pair of through holes is three times or more of a cross sectional area of the drawn part.

5. The electrolytic capacitor according to claim 1, wherein:
   the seat plate includes a partition wall including a part of an inner surface of each of the pair of through holes and being located between the pair of through holes, and
   a first distance is shorter than a second distance, the first distance being a distance between the partition wall and the center of the drawn part in an alignment direction in which the pair of through holes are aligned, the second distance being a distance between the inner surface of a corresponding one of the pair of through holes and the center of the drawn part in a direction orthogonal to the alignment direction when viewed in the axial direction.

6. The electrolytic capacitor according to claim 1, wherein:
- the seat plate includes a partition wall including a part of an inner surface of each of the pair of through holes and being located between the pair of through holes, and
- the partition wall includes a flat surface having a planar shape, the flat surface being provided as a part of the inner surface of one of the pair of through holes.

7. The electrolytic capacitor according to claim 1, wherein:
- the seat plate includes a rotation regulation structure, the rotation regulation structure being provided in a region facing a corresponding one of the pair of lead members to regulate the capacitor main body from rotating.

8. The electrolytic capacitor according to claim 1, wherein a length of the case in the axial direction is 1.4 times or more of a diameter of the case.

9. A seat plate provided to an electrolytic capacitor, the electrolytic capacitor including a capacitor main body, the capacitor main body including:
- an exterior member including a case and a closing part, the case having a hollow column shape and including an opening part at an end in an axial direction of the hollow column shape, the closing part closing the opening part, and
- a pair of lead members each including a drawn part exposed from the closing part, the drawn part having a bar shape, wherein:
  - when viewed in the axial direction, a width of the drawn part is 0.1 times or more of a diameter of the exterior member,
  - the pair of lead members further each include an extended part connected to the drawn part, the extended part having a thickness smaller than the width of the drawn part,
  - when viewed in the axial direction, a center of the extended part in a thickness direction is located at a position that is away from a center of the drawn part and is closer to a center of the case than the center of the drawn part is,
  - the seat plate has a pair of through holes respectively allowing the pair of lead members to pass through, and
  - when viewed in the axial direction, a distance between the pair of through holes is equal to or shorter than a radius of a virtual circle, the virtual circle having a center identical to the center of the drawn part and a diameter having same length as the width of the extended part.

10. The seat plate according to claim 9, further comprising a partition wall including a part of an inner surface of each of the pair of through holes and being located between the pair of through holes, and
- the seat plate is attached to the capacitor main body so that, when viewed in the axial direction, the virtual circle partially overlaps with the partition wall.

* * * * *